United States Patent [19]

Chattha et al.

[11] Patent Number: 4,710,543
[45] Date of Patent: Dec. 1, 1987

[54] GLYCIDYL-HYDROXY-ACRYLIC HIGH SOLIDS COATING COMPOSITIONS

[75] Inventors: Mohinder S. Chattha, Livonia; Ares N. Theodore, Farmington Hills, both of Mich.

[73] Assignee: E. I. du Pont de Nemours and Company, Wilmington, Del.

[21] Appl. No.: 425,191

[22] PCT Filed: Aug. 9, 1982

[86] PCT No.: PCT/US82/01089
§ 371 Date: Aug. 9, 1982
§ 102(e) Date: Aug. 9, 1982

[87] PCT Pub. No.: WO84/00768
PCT Pub. Date: Mar. 1, 1984

[51] Int. Cl.[4] .................. C08L 37/00; C08L 61/24; C08L 61/28

[52] U.S. Cl. .................. 525/161; 525/162; 525/163; 524/314; 524/361

[58] Field of Search .................. 525/161, 162, 163

[56] References Cited

U.S. PATENT DOCUMENTS

| | | | |
|---|---|---|---|
| 3,622,651 | 11/1971 | Vasta | 525/161 |
| 3,932,367 | 1/1976 | Labana et al. | 427/27 |
| 4,044,070 | 8/1977 | Labana et al. | 525/103 |
| 4,069,275 | 1/1978 | Labana et al. | 525/207 |
| 4,178,319 | 12/1979 | Chattha | 525/188 |
| 4,178,321 | 12/1979 | Chattha | 525/188 |
| 4,181,783 | 1/1980 | Chattha | 525/161 |

Primary Examiner—John C. Bleutge
Assistant Examiner—Robert E. L. Sellers, II
Attorney, Agent, or Firm—Hilmar L. Fricke

[57] ABSTRACT

A thermosetting coating composition with excellent weatherability adapted for use as an automotive topcoat which upon curing forms a hard, glossy, durable coating. The coating composition, which reacts in situ during curing, characterized in that the composition comprises a mixture of:

(A) acrylic copolymer bearing pendant epoxide functionality and hydroxyl functionality and having a number average molecular weight ($\overline{M}_n$) of between about 1000 and about 5000;

(B) dicarboxylic acid anhydride comprising at least about 50 weight percent of alkyl hexahydrophthalic anhydride;

(C) amine-aldehyde crosslinking agent; and (D) solvent.

23 Claims, No Drawings

GLYCIDYL-HYDROXY-ACRYLIC HIGH SOLIDS COATING COMPOSITIONS Reference is made to commonly assigned and concurrently filed U.S. applications Ser. Nos. 432,897, now abandoned, entitled "Acrylic-Hydroxy-Epoxy High Solids Coating Compositions" and 432,896 entitled "High Solids Coating Compositions", both to Chattha et al.

TECHNICAL FIELD

This invention relates to high solids, thermosetting coating compositions, which when cured, exhibit excellent weatherability and are adapted to provide an automotive topcoat which demonstrates hardness, high gloss and excellent resistance to solvents and water. More particularly, the coating compositions of this invention comprise a mixture of a low molecular weight glycidyl-functional/hydroxyl-functional acrylic copolymer, dicarboxylic acid anhydride including at least about 50 weight percent of alkyl hexahydrophthatic anhydride, amine-aldehyde crosslinking resins and solvent. The composition mixture reacts in situ during curing at elevated temperature to form the coating.

BACKGROUND OF THE INVENTION

Because of increasingly strict solvent emission regulations in recent years, low solvent emission paints have become very desirable. A number of high solids paint compositions have been proposed to meet these low solvent emission requirements. However, many of the compositions are deficient because of difficulty in application, slow curing rates, complex and/or time consuming composition formulation, poor durability and low solvent and water resistance of the coating.

One composition, which has been proposed to overcome these deficiencies is taught in U.S. application Ser. No. 334,684, filed Dec. 12, 1981, now U.S. Pat. No. 4,394,486, in the name of the inventors of this application. In that composition, hydroxy functional acrylic copolymers react with anhydrides of dicarboxylic acids to produce hydroxy acid and polyacid copolymers. The composition of such a mixture is largely dictated by the stoichiometry of the reactants employed. These acid products are then reacted with epoxies to produce hydroxy functional resins. Subsequently a composition comprising a mixture of these hydroxy functional resins and amine-aldehyde crosslinking agent can be applied to a substrate and cured at elevated temperatures to obtain a crosslinked structure. Unexpectedly, we have now found that all of the aforementioned reactions can be carried out in situ during curing on the substrate to obtain high solids coatings with excellent physical properties. While not wishing to be bound by theory, it is believed that in this reaction sequence the hydroxyl functionality of the glycidyl hydroxy acrylic copolymer reacts with the anhydride to produce acid functionality which further reacts with the epoxide functionality of the copolymer to produce hydroxyl moiety; then at higher temperatures, the amine-aldehyde reacts with the hydroxyl functionality to produce a crosslinked network. This crosslinking reaction is facilitated by the unconsumed acid present in the composition.

DISCLOSURE OF THE INVENTION

The thermosetting coating composition of this invention preferably contains greater than about 60% by weight, more preferably greater than 70% by weight, of nonvolatile solids. The composition is characterized in that it comprises a mixture of:

(A) acrylic copolymer bearing pendant epoxide groups and pendent hydroxyl groups, wherein the total of such epoxide and hydroxyl groups per molecule is preferably greater than about three, most preferably about five, and having a number average molecular weight ($\overline{M}_n$) of between about 1000 and about 5000, preferably between about 1500 and about 3000;

(B) dicarboxylic acid anhydride comprising at least about 50 weight percent, preferably greater than about 80 weight percent, of alkyl hexahydrophthalic anhydride;

(C) amine-aldehyde crosslinking agent; and (D) solvent.

The composition reacts in situ during curing at elevated temperatures to form the coating.

The acrylic copolymer is prepared from a monomer mixture comprising (i) between about 5 and about 35, preferable between about 10 and about 20 weight percent of glycidyl ester of a monoethylenically unsaturated carboxylic acid, (ii) between about 5 and about 35, preferably between about 10 and about 20 weight percent of hydroxy alkyl acrylate or hydroxy alkyl methacrylate and (iii) between about 60 and about 90 weight percent of other monoethylenically unsaturated monomers. The dicarboxylic acid anhydride is included in an amount so as to provide between about 1.0 and 1.2, preferably about 1.0 anhydride groups per epoxide group on the acrylic copolymer. The amine-aldehyde is included in the composition in amount sufficient to provide at least about 0.60, preferably between about 0.75 and 2.75 nitrogen crosslinking functional group for each hydroxyl group initially present in the composition on the acrylic copolymer (A).

In addition, the coating composition of this invention may include additives such as catalysts, antioxidants, U.V. absorbers, flow control or wetting agents, antistatic agents, pigments, plasticizers, etc. The compositions of this invention are also compatible with non-aqueous dispersions (NAD's), which are generally used as flow control additives.

This invention overcomes the above mentioned deficiencies of prior high solids coating compositions and provides a high solids composition particularly suitable for use as an automotive topcoat, clear or pigmented, which exhibits outstanding weatherability.

Advantageously, since the composition of this invention is applied to the substrate as an essentially unreacted mixture of low molecular weight materials, little solvent is required to maintain a desirable low application viscosity, i.e., the composition can be of very high solids level.

The composition of this invention, being of essentially single step formulation, offers a distinct commercial advantage over those compositions whose formulation includes a series of reaction steps prior to curing, since such reaction steps generally require heat, agitation and monitoring for extended periods of time.

Advantageously, during the in situ reactions during curing of the composition of this invention, carboxyl functionality is generated which, until it is later consumed by further reaction, acts as a catalyst for the crosslinking reaction.

BEST MODE FOR CARRYING OUT THE INVENTION

The coating compositions of this invention provide a system which is particularly suitable for those applications requiring a coating having high gloss, hardness, adhesion, high solvent and water resistance and superior weatherability. The components of the coating composition of this invention are combined to form a homogeneous mixture which is then applied to a substrate and cured at elevated temperatures.

Each of the components of the coating composition, the amounts of each of the components required to achieve the desired results of the invention and a method for applying the composition are described hereinafter in greater detail.

(A) GLYCIDYL-HYDROXY FUNCTIONAL ACRYLIC POLYMER

One material in the high solids coating composition of this invention is glycidyl-hydroxy-acrylic copolymer, i.e., copolymer bearing pendant epoxide and hydroxyl groups, which may be prepared by conventional free radical induced polymerization of suitable alpha-beta unsaturated monomers. The term "copolymer" as used herein refers to a copolymer of two or more different monomers at least one of which contains pendant epoxide groups and at least one of which contains pendent hydroxyl groups.

The copolymers used in the coating composition of this invention have a number average molecular weight ($\overline{M}_n$) of between about 1000 and about 5000, preferably between about 1500 and about 3000.

The monomers used to prepare the copolymer include between about 5 and about 35 weight percent of one or more glycidyl esters of a monoethylenically unsaturated carboxylic acid, e.g., glycidyl acrylate and glycidyl methacrylate. These monomers provide the copolymer with its epoxide functionality.

The monomers used to prepare the copolymer include between about 5 and about 35 weight percent of one or more monoethylenically unsaturated monomers bearing hydroxyl functionality. The monoethylenically unsaturated hydroxy functional monomers useful in preparation of the copolymer and providing the hydroxy functionality to the copolymer may be selected from a long list of hydroxy functional monomers. Preferably, however, the hydroxy functional monomers are acrylates and may be selected from the group consisting of, but not limited to the following esters of acrylic or methacrylic acids and aliphatic alcohols: 2-hydroxyethyl acrylate; 3-chloro-2-hydroxypropyl acrylate; 2-hydroxy-1-methylethyl acrylate; 2-hydroxypropyl acrylate; 3-hydroxypropyl acrylate; 2,3 dihydroxypropyl acrylate; 2-hydroxybutyl acrylate; 4-hydroxybutyl acrylate; diethylene glycol acrylate; 5-hydroxypentyl acrylate; 6-hydroxyhexyl acrylate; triethyleneglycol acrylate; 7-hydroxyheptyl acrylate; 2 hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2,3-dihydroxypropyl methacrylate; 2-hydroxybutyl methacrylate; 4-hydroxybutyl methacrylate; 3,4-dihydroxybutyl methacrylate; 5-hydroxypentyl methacrylate; 6-hydroxyhexyl methacrylate; 1,3-dimethyl-3-hydroxybutyl methacrylate; 5,6 dihydroxyhexyl methacrylate; and 7-hydroxyheptyl methacrylate.

Although one of ordinary skill in the art will recognize that many different hydroxyl bearing monomers, including those listed, above could be employed, the preferred hydroxy functional monomers for use in the copolymer of the invention are $C_5$–$C_7$ hydroxy alkyl acrylates and/or $C_6$–$C_8$ hydroxy alkyl methacrylates, i.e., esters of $C_2$–$C_4$ dihydric alcohols and acrylic or methacrylic acids.

Except in those instances wherein a specific compound is named, the term "acrylate" is used in this specification to include esters of both acrylic and methacrylic acid, i.e., acrylates and methacrylates.

The remainder of the monomers forming the copolymer, i.e., between about 60 and about 90 weight percent of the monomers of the copolymer, are other monoethylenically unsaturated monomers. These other monoethylenically unsaturated monomers are preferably alpha-beta olefinically unsaturated monomers, i.e., monomers bearing olefinic unsaturation between the two carbon atoms in the alpha and beta positions with respect to the terminus of an aliphatic carbon-to-carbon chain.

Among the alpha-beta olefinically unsaturated monomers which may be employed are other acrylates (meaning esters of either acrylic or methacrylic acids not containing glycidyl or hydroxyl functionality), as well as mixtures of these other acrylates and other monovinyl hydrocarbons. Preferably, in excess of 50 weight percent of the total of the copolymer monomers are acrylates (this total including glycidyl acrylates, hydroxyl functional acrylates and other acrylates). These other acrylates are preferably selected from esters of $C_1$–$C_{12}$ monohydric alcohols and acrylic or methacrylic acids, i.e., methyl methacrylate, ethylacrylate, butylacrylate, (iso)-butylmethacrylate, hexylacrylate, 2-ethylhexyl acrylate, laurylmethacrylate, etc. Monovinyl hydrocarbons when they are employed, should preferably constitute less than 50 weight percent of the copolymer. Among the monovinyl hydrocarbons suitable for use in forming the copolymers are those containing 3 to 12, preferably 8 to 12 carbon atoms and including styrene, alpha methylstyrene, vinyl toluene, t-butylstyrene and chlorostyrene. Other such monovinyl monomers such as vinyl chloride, acrylonitrile, methacrylonitrile, and vinyl acetate may be included in the copolymer as modifying monomers. However, when employed, these modifying monomers should constitute only between about 0 and about 30 weight percent of the monomers in the copolymer. Small amounts of ethylenically unsaturated carboxylic acids can also be used in preparing the copolymer, such as acrylic acid, methacrylic acid, crotonic acid, itaconic acid, maleic acid and the like.

The copolymer preferably contains at least about 3 functional groups per molecule based on epoxide and hydroxyl functionality. The copolymer of the coating composition most preferably contains a total of about 5 functional groups (i.e., epoxide and hydroxyl functional groups) per molecule, e.g., 3 epoxides and 2 hydroxyl groups, or 4 hydroxyl and 1 epoxide groups.

A preferred embodiment of this invention comprises a copolymer of glycidyl methacrylate, hydroxyethyl methacrylate, isobutyl methacrylate and styrene.

In preparing the copolymer, the epoxide functional monomers, the hydroxy functional monomers, and the remaining monoethylenically unsaturated monomers are mixed and reacted by conventional free radical initiated polymerization in such proportions as to obtain the copolymer desired. A large number of free radical initiators are known to the art and are suitable for the purpose. These include: benzoyl peroxide; lauryl peroxide; t-butylhydroxy peroxide; acetylcyclohexylsulfonyl peroxide; diisobutyryl peroxide; di(2-ethylhexyl)peroxydicarbonate; diisopropylperoxydicarbonate; t-butylperoxypivalate; decanoyl peroxide; azobis(2-methylpropionitrile), etc. The polymerization is preferably carried out in solution using a solvent in which the epoxide-functional, hydroxylfunctional copolymer is soluble. Included among the suitable solvents are toluene, methyl amyl ketone, xylene, dioxane, butanone, etc. If the epoxide-functional, hydroxy-functional copolymer is prepared in solution, the solid copolymer can be precipitated by pouring the solution at a slow rate into a nonsolvent for the copolymer such as hexane, octane, or water under suitable agitation conditions.

The copolymer useful in the compositions of this invention can also be prepared by emulsion polymerization, suspension polymerization, bulk polymerization, or combinations thereof, or still other suitable methods. In these methods of preparing copolymers, chain transfer agents may be required to control molecular weight of the copolymer to a desired range. When chain transfer agents are used, care must be taken so they do not decrease the shelf stability of the composition by causing premature chemical reactions.

Various mixtures of these types of copolymers may also be employed within the scope of the compositions of the invention described herein.

(B)

DICARBOXYLIC ACID ANHYDRIDE

The anhydride used in this composition comprises at least 50 percent by weight, and up to 100 percent by weight, of alkyl hexahydrophthalic anhydride, wherein the alkyl group preferably comprises up to about 7 carbons, more preferably up to 4 carbons. Most preferably the alkyl hexahydrophthalic anhydride comprises methyl hexahydrophthalic anhydride. The remainder of the anhydrides, i.e., 0 to about 50 weight percent, more preferably 0 to about 20 weight percent, and most preferably 0 to about 10 percent by weight, are selected from a variety of anhydrides, which include but are not limited to, hexahydrophthalic, 2-dodecene-1-ylsuccinic, tetrahydrophthalic, methyl tetrahydrophthalic and camphoric anhydrides, and mixtures of suitable anhydrides.

The anhydride is included in the composition in an amount sufficient to provide between about 1.0 and about 1.2, more preferably about 1.0 anhydride equivalents per pendant epoxide group initially present on the copolymer. During curing, it appears that the anhydride reacts with hydroxyl groups on the copolymer forming carboxyl groups. In compositions wherein excess anhydride (i.e., relative to hydroxyl groups) is present, it appears that the excess anhydride will later react with the hydroxyl groups generated by subsequent carboxyl/epoxide reactions to form more carboxyl groups. Since epoxide is present in an amount substantially corresponding to the anhydride, these carboxyl groups will subsequently be reacted with epoxide to form (i.e., regenerate) hydroxyl functionality.

Catalysts are generally included in the composition to accelerate the epoxide/carboxyl reaction. Suitable catalyst for this epoxide/carboxyl reaction are well known in the art. Preferred catalysts useful for this reaction are the tetralkyl ammonium salts such as tetra methyl ammonium chloride, tetraethyl ammonium bromide and trimethyl benzyl ammonium chloride as well as metal salts of a carboxylic acid, such as potassium octoate or chromium III octoate. Other useful catalysts include: metal halides such as chromium trichloride, ferric trichloride, and aluminum trichloride; mercaptans and thioethers such as octyl mercaptan, dimercapto propanol and dimercapto-diethyl ether; tertiary amines such as triethyl amine, pyridine, dimethylandine, quinoline, -picoline, ethylpyridine, and the like. Still other catalysts known to catalyze the carboxyl/epoxide reaction will be apparent to those skilled in this art.

(C)

AMINO CROSSLINKING AGENT

Another essential component of the paint compositions of this invention is an amine-aldehyde crosslinking agent. Amine-aldehyde crosslinking agents suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents useful in this invention are amine-aldehyde resins such as condensation products of formaldehyde with melamine, substituted melamine, urea, benzoquanamine or substituted benzoquanamine. Preferred members of this class are methylated melamine-formaladehyde resins such as hexamethoxylmelamine. These liquid crosslinking agents have substantially 100 percent nonvolatile content as measured by the foil method at 45° C. for 45 minutes. For the purpose of the preferred high solids coatings of the invention it should be recognized that it is important not to introduce extraneous diluents that would lower the final solids content of the coating. Other suitable amine-aldehyde crosslinking agents would be apparent to one skilled in the art.

Particularly preferred crosslinking agents are the amino crosslinking agents sold by American Cyanamid, Wayne, N.J. under the trademark "Cymel". In particular, Cymel 301, Cymel 303, Cymel 325 and Cymel 1156, which are alkylated melamine-formaldehyde resins, are useful in the compositions of this invention.

The crosslinking reactions are known to be catalytically accelerated by acids. Therefore, the unconsumed carboxyl groups acts as a catalyst for the crosslinking reaction. In addition, if desired, catalysts may be added to the composition which accelerate the crosslinking reaction. One such catalyst, for example, is p-toluene sulfonic acid and the amine salts thereof. Other useful catalysts are well known to one skilled in the art. Selection of optimal cure temperature would be well within the skill of one in the art. The amine-aldehyde materials function as a crosslinking agent in the composition of the invention by reacting with the hydroxyl groups of the composition, which groups were either present initially on the copolymer and nonreacted or regenerated during subsequent in situ reactions of initially present hydroxyl groups.

In order to achieve the outstanding properties which make these coating compositions particularly useful as automotive topcoat materials, it is essential that the amount of amino crosslinking agent be sufficient to substantially crosslink the hydroxyl groups in the coating composition. Therefore, the amino crosslinking agent should be included in the composition in an amount sufficient to provide at least about 0.60, preferably between about 0.75 and about 2.75, groups of nitrogen crosslinking functional group for each hydroxyl group included in the composition either as an initially present and unreacted hydroxyl group on the copolymer or as a regenerated hydroxyl group i.e., by means of in situ reactions with anhydride and epoxy. The hydroxyl groups present in the composition and available for crosslinking can therefore be essentially taken to be equal to hydroxyl groups initially present on the copolymer (A).

(D) SOLVENT

It is generally suitable and preferable, in order to achieve the preferred high solids content of the coating compositions of the invention, to use little solvent in the composition. Suitable solvents which may be employed include those commonly used, such as toluene, xylene, methyl amyl ketone, acetone, butyl acetate, tetrahydrofuran, ethylacetate, dimethylsuccinate, dimethylglutarate, dimethyladipate or mixtures thereof. The solvent, in which the hydroxy glycidyl acrylic copolymer is prepared, may be employed as a solvent for the coating composition thus eliminating the need for, drying the copolymer after preparation, if such is desired.

As mentioned above, the nonvolatile solids content of the coating composition is preferably at least 60% and more preferably 70% or more, thus limiting the amount of solvent included in the composition. However, while the composition is particularly suitable for use as a high solids composition, the composition is also suitable for use as low solids compositions. Determination of optimal solids content for a given application would be within the skill of one in the art.

OTHER MATERIALS

In addition to the above discussed components, other materials may be included in the coating compositions of the invention. These include materials such as catalysts, antioxidants, U.V. absorbers, solvents, surface modifiers and wetting agents, as well as pigments.

Surface modifiers or wetting agents are comomon additives for liquid paint compositions. The exact mode of operation of these surface modifiers is not known, but it is thought that their presence contributes to better adhesion of the coating composition to the surface being coated and helps formation of thin coatings, particularly on metal surfaces. These surface modifiers are exemplified by acrylic polymers containing 0.1–10 percent by weight of copolymerized monoethylenically unsaturated carboxylic acids such as methacrylic acid, acrylic acid or itaconic acid, cellulose acetate butyrate, silicone oils or mixtures thereof. Of course, the choice of surface modifiers or wetting agent is dependent upon the type of surface to be coated and selection of the same is clearly within the skill of the artisan.

The coating composition of the invention also may include pigments. The amount of pigment in the coating composition may vary, but preferably is between about 3 and about 45 weight percent based on the total weight of the paint composition. If the pigment is metallic flake, the amount generally ranges from about 1 to about 20 weight percent.

For many applications of the coating compositions of this invention, particularly high solids compositions, it may be desirable to employ flow control additives to provide sag free coatings. Among numerous such materials, NAD's such as described by Porter (S. Porter, Jr. and B. N. McBane, U.S. Pat. No. 4,025,474, May 24, 1977) are compatible with these coating compositions. These particle dispersions may be included in an amount up to 15% by weight of the total composition. Other types of NAD's such as described by D. L. Maker and S. C. Peng (U.S. Pat. No. 3,814,721, June 4, 1974 or by S. K. Horvath (U.S. application Ser. No. 292,853, filed Aug. 14, 1981, now U.S. Pat. No. 4,415,681) also may be included in the paint composition.

APPLICATION TECHNIQUES

The coating composition can be applied by conventional methods known to those skilled in the art. These methods include roller coating, spray coating, dipping or brushing and, of course, the particular application technique chosen will depend on the particular substrate to be coated and the environment in which the coating operation is to take place.

A particularly preferred technique for applying the high solids coating compositions, particularly when applying the same to automobiles as topcoats, is spray coating through the nozzle of a spray gun.

High solids paints have in the past caused some difficulty in spray coating techniques because of the high viscosity of the materials and resultant problems in clogging of spray guns. However, because the compositions of this invention demonstrate relatively low viscosity, considering the high solids content, they can be applied by spray coating techniques.

The invention will be further understood by referring to the following detailed examples. It should be understood that the specific examples are presented by way of illustration and not by way of limitation. Unless otherwise specified, all references to "parts" is intended to mean parts by weight.

EXAMPLE 1

In a round-bottom four-necked flask, equipped with a stirrer, a dropping funnel, a thermometer and a condenser, 500 ml methyl amyl ketone is brought to reflux under nitrogen. The following mixture of monomers is employed for polymer synthesis:

|  | Wt./gms | Wt./% |
|---|---|---|
| Butyl methacrylate | 300 | 40 |
| Glycidyl methacrylate | 210 | 28 |
| Hydroxyethyl methacrylate | 45 | 6 |
| Methyl methacrylate | 195 | 26 |

Thirty-seven (37) grams of tert-butyl perbenzoate are added to the above monomers and the resulting solution added dropwise to refluxing methyl amyl ketone over a period of one hour and 20 minutes. The heating and stirring is continued for half an hour after the addition is complete and then one more gram tert-butyl perbenzoate is added portionwise to the reaction mixture. The reaction mixture is refluxed for two more hours and then allowed to cool to room temperature. The molecular weight of the polymer is determined by gel permeation chromatography and found to be $\overline{M}_n = 3320$ and $\overline{M}_w/\overline{M}_n = 2.1$.

Seventy-five (75) parts of Cymel 325 (American Cyanamid, Wayne, N.J.), 0.75 parts of Cordova Accelerator AMC ™-2 (Cordova Chemical, Sacramento, Calif.) and 17 parts of butyl acetate. Fourteen (14) parts of methylhexahydrophthalic anhydride are added to the above solution and the resulting composition is applied by spraying to primed steel panels. The panels are baked at 135° C. for 18 minutes to obtain coatings with excellent hardness, adhesion and solvent resistance.

EXAMPLE 2

In a two liter round-bottom flask, equipped with a stirrer, a condenser and a dropping funnel, 750 ml toluene is heated to reflux under nitrogen. The following mixture of monomers containing 15 grams of 2,2'-azo-bis-(2-methyl-propionitrile) dissolved in 50 ml acetone, is added dropwise to the refluxing toluene.

|  | Wt./gms | Wt./% |
| --- | --- | --- |
| iso-Butyl methacrylate | 210 | 70 |
| Glydicyl methacrylate | 45 | 15 |
| Hydroxypropyl methacrylate | 45 | 15 |

The addition of the initiator and monomer solution is completed in three hours. The reaction mixture is refluxed for half an hour and a 10 ml acetone solution of 2 grams of the above initiator is added dropwise and the reaction mixture refluxed for one hour. Part of the solvent is distilled off to bring the solids content to 62% by weight.

Fifty (50) parts of the above polymer solution, 19 parts of Cymel 325 and 0.6 parts of Cordova Accelerator AMC ™-2 (Cordova Chemical, Sacramento, Calif.) are dissolved in 14 parts of methyl amyl ketone and 5.5 parts of methylhexahydrophthalic anhydride are added to the above solution. The resulting composition is applied by spraying to primed steel panels which are baked at 130° C. for 18 minutes to obtain hard, glossy coatings with excellent adhesion and solvent resistance.

EXAMPLE 3

A copolymer is prepared by following the procedure described in Example 1 in methyl amyl ketone and by using the following monomers:

|  | Wt. % |
| --- | --- |
| Butyl methacrylate | 50 |
| Ethylhexyl acrylate | 10 |
| Glycidyl methacrylate | 15 |
| Hydroxypropyl methacrylate | 10 |
| Methyl methacrylate | 10 |
| Styrene | 5 |

Tert-butyl peroctoate (5.25% of monomers) is used as initiator and determined solids content is 63% by weight.

A mill base is prepared by dispensing TiO$_2$ in the above polymer with a high speed Cowl's blade. The composition of the mill base is: polymer 15%, TiO$_2$ 65% and methyl amyl ketone 20%.

Forty-two (42) parts of the above mill base are mixed with 27 parts of the polymer solution, 11 parts of Cymel 325, 0.55 parts of Cordova Accelerator AMC ™-2 and 12 parts of n-butyl acetate. Four (4) parts of methylhexahydrophthalic anhydride are added to the above formulation and the resulting composition is applied by spraying to primed steel panels. The panels are baked at 130° C. for 19 minutes to obtain white coatings with excellent physical properties.

EXAMPLE 4

A glycidyl hydroxy polymer of $\overline{M}_n=2900$ is prepared from glycidyl methacrylate (20%), hydroxyethyl methacrylate (10%) isobutyl methacrylate (65%) and styrene (5%) in refluxing methyl amyl ketone (59%) non-volatiles) as described in Example 1.

Twenty-one (21) parts of the above polymer solution, six parts of Cymel 325 and 1 drop of Cordova Accelerator AMC ™-2 are dissolved in 8 parts of butyl acetate. Methylhexahydrophthalic anhydride (2.9 parts) is added to the above solution and the resulting formulation is drawn on a primed panel which is baked at 130° C. for 17 minutes to obtain coatings with excellent xylene and methyl ethyl ketone resistance.

EXAMPLE 5

Eight (8) parts of aluminum flakes (65% in naphtha) and 15 parts of flow control additive prepared according to U.S. Pat. No. 4,025,474, are added to the polymer/melamine component described in Example 1 and the mixture is placed on a shaker for one hour. Fourteen (14) parts of methylhexahydrophthalic anhydride are added to the above composition and resulting formulation is applied by spraying in three coats to primed steel panels. The panels are flashed for five minutes at room temperature and baked for 18 minutes at 130° C. to obtain silver metallic coatings with excellent hardness, adhesion and solvent resistance.

EXAMPLE 6

In the composition described in Example 2, a solution of 1.9 parts adipic anhydride in 3.5 parts of methylhexahydrophthalic anhydride is added instead of the anhydride employed therein. The resulting composition is applied by spraying to primed steel panels which are baked at 130° C. for 18 minutes to obtain hard, glossy coatings with excellent adhesion and solvent resistance.

EXAMPLE 7

A copolymer is prepared by following the procedure described in Example 1 in methyl amyl ketone and by using the following monomers:

|  | Wt./% |
| --- | --- |
| Butyl methacrylate | 45 |
| Ethylhexyl acrylate | 8 |
| Glycidyl methacrylate | 15 |
| Hydroxypropyl methacrylate | 15 |
| Methyl methacrylate | 10 |
| Vinyl acetate | 7 |

Tert-butyl perbenzoate (5% of monomers) is used as initiator and determined solids content is 62%.

Fifty-five (55) parts of this polymer solution, 19.5 parts of Cymel 325 and 0.6 parts of Cordova Accelerator AMC ™-2 are dissolved in 15 parts of butyl acetate and 6 parts of methylhexahydrophthalic anhydride are added to this solution. The resulting composition is applied by spraying to primed steel panels which are baked at 130° C. for 19 minutes to obtain coatings with excellent physical properties.

EXAMPLE 8

A copolymer is prepared by following the procedure described in Example 1 in methyl amyl ketone from the following monomers:

|  | Wt./% |
| --- | --- |
| Allyl alcohol | 5 |
| Butyl methacrylate | 50 |
| Glycidyl methacrylate | 15 |
| Hydroxypropyl methacrylate | 15 |
| Methyl methacrylate | 15 |

Tert-butyl peroctoate (5.1% of monomers) is used as initiator and solids content is 62.5%.

Fifty (50) parts of this polymer solution, 18 parts of Cymel 301, 0.5 parts Cordova Accelerator AMC TM -2 and 0.2 part of p-toluene sulfonic acid are dissolved in 17 parts of butyl acetate. Methylhexahydrophthalic anhydride (5.5 parts) is added to the above solution and the resulting composition is applied by spraying to primed steel panels. The panels are baked at 130° C. for 19 minutes to obtain coatings with excellent physical properties.

INDUSTRIAL APPLICABILITY

It will be obvious from the foregoing that this invention has industrial applicability, particularly to the automotive industry, and provide a coating with excellent exterior weatherability and distinct commercial advantages.

We claim:

1. A thermosetting coating composition, characterized in that said composition comprises a mixture of components:
   (A) acrylic copolymer bearing pendant epoxide groups and hydroxyl groups and having a number average molecular weight ($\overline{M}_n$) of between about 1000 and about 5000, said copolymer being prepared from a monomer mixture comprising (i) between about 5 and about 35 weight percent of glycidyl ester of a monoethylenically unsaturated carboxylic acid, (ii) between about 5 and about 35 weight percent of hydroxy alkyl acrylate or hydroxy alkyl methacrylate and (iii) between 60 and about 90 weight percent of other monoethylenically unsaturated monomers;
   (B) dicarboxylic acid anhydride comprising at least about 50 percent by weight of alkyl hexahydrophthalic anhydride, said dicarboxylic acid anhydride being included in said composition in an amount so as to provide between about 1.0 and about 1.2 anhydride groups for each epoxide group on said acrylic copolymer;
   (C) amine-aldehyde crosslinking agent included in said composition in an amount sufficient to provide at least about 0.60 nitrogen crosslinking functional groups for each hydroxyl group initially present in said composition on said copolymer (A); and
   (D) solvent,
said coating composition being an essentially unreacted mixture of said components.

2. A coating composition according to claim 1, wherein said hydroxy alkyl acrylates are selected from $C_5$–$C_7$ hydroxy alkyl acrylates, and said hydroxy alkyl methacrylates are selected from $C_6$–$C_8$ hydroxy alkylmethacrylates.

3. A coating composition according to claim 2, wherein said other monoethylenically unsaturated monomers comprise other acrylates, or mixtures of said other acrylates and other monovinyl hydrocarbons.

4. A coating composition according to claim 3, wherein said other acrylates are esters of a $C_1$–$C_8$ monohydric alcohol and acrylic or methacrylic acid and said other monovinyl hydrocarbons are $C_3$–$C_{12}$ vinyl monomers.

5. A coating composition according to claim 1, wherein the total of said pendant epoxide groups and hydroxyl groups per molecule of said acrylic copolymer is about five.

6. A coating composition according to claim 1, wherein said alkyl group of said alkyl hexahydrophthalic anhydride comprises a lower alkyl group having up to about seven carbons.

7. A coating composition according to claim 1, wherein said dicarboxylic acid anhydride comprises at least about 80 percent by weight of an alkyl hexahydrophthalic anhydride.

8. A coating composition according to claim 1 or 7, wherein said dicarboxylic acid anhydride is included in said composition in an amount so as to provide about 1.0 anhydride groups for each epoxide group of said acrylic copolymer.

9. A coating composition according to claim 6 or 7, wherein said alkyl hexahydrophthalic anhydride is methyl hexahydrophthalic anhydride.

10. A coating composition according to claim 1, wherein up to about 50 percent by weight of said dicarboxylic acid anhydride employed in said composition comprises an anhydride selected from the group consisting of hexahydrophthalic anhydride, 2-dodecene-1-ylsuccinic anhydride, tetrahydrophthalic anhydride, methyl tetrahydrophthalic anhydride, camphoric anhydride, and mixtures of the above.

11. A coating composition according to claim 1, wherein said amine-aldehyde crosslinking agent is selected from the group consisting of condensation products of formaldehyde with melamine, substituted melamine, urea, benzoquanamine and substituted benzoguanamine and mixtures of said condensation products and is included in an amount sufficient to provide between about 0.75 and about 2.75 nitrogen crosslinking functional groups for each hydroxyl group initially present on said copolymer (A).

12. A coating composition according to claim 1, which further comprises up to about 15 weight percent, based on the total weight of the composition, of a flow control additive.

13. A high solids thermosetting coating composition which contains greater than about 60 weight percent of nonvolatile solids and which, except for pigments and other nonreactive components, is characterized by consisting essentially of a mixture of components:
   (A) acrylic copolymer bearing pendant epoxide functionality and hydroxyl functionality and having a number average molecular weight ($\overline{M}_n$) of between about 1000 and about 5000, and said copolymer being prepared from a monomer mixture comprising (i) between about 5 and about 35 weight percent of glycidyl ester of monoethylenically unsaturated carboxylic acid (ii) between about 5 and about 35 weight percent of hydroxy alkyl acrylate or hydroxy alkyl methacrylate, and (iii) between about 60 and about 90 weight percent of other monoethylenically unsaturated monomers;

(B) dicarboxylic acid anhydride comprising at least about 50 percent by weight of alkyl hexahydrophthalic anhydride, said dicarboxylic acid anhydride being included in said composition in an amount so as to provide between about 1.0 and 1.2 anhydride groups for each epoxide group on said acrylic copolymer;

(C) amine-aldehyde crosslinking agent included in said composition in an amount sufficient to provide at least about 0.60 nitrogen crosslinking functional groups for each hydroxyl group initially present in said composition on said copolymer (A); and (D) solvent, said coating composition being an essentially unreacted mixture of said components.

14. A high solids coating composition according to claim 13, wherein said hydroxy alkyl arcylates are selected from $C_5$-$C_7$ hydroxy alkyl acrylates, and said hydroxy alkyl methacrylates are selected from $C_6$-$C_8$ hydroxy alkyl methacrylates.

15. A high solids coating composition according to claim 14, wherein said other monoethylenically unsaturated monomers are selected from the group consisting of other acrylates, and mixtures of said other acrylates and other monovinyl hydrocarbons.

16. A high solids coating composition according to claim 15, wherein said other acrylates are esters of a $C_1$-$C_8$ monohydric alcohol and acrylic or methacrylic acid and said other monovinyl hydrocarbons are $C_3$-$C_{12}$ vinyl monomers.

17. A high solids coating composition according to claim 13, wherein the total of said pendant epoxide functionality and hydroxyl functionality of said acrylic copolymer is about five.

18. A high solids coating composition according to claim 13, wherein said alkyl group of said alkyl hexahydrophthalic anhydride comprises a lower alkyl group having up to about seven carbons.

19. A high solids coating composition according to claim 13, wherein said dicarboxylic acid anhydride comprises at least about 80 percent by weight of an alkyl hexahydrophthalic anhydride.

20. A high solids coating composition according to claim 13 or 19, wherein said dicarboxylic acid anhydride is included in said composition so as to provide about 1.0 anhydride groups for each epoxide group of said acrylic copolymer.

21. A high solids coating composition according to claim 18 or 19, wherein said alkyl hexahydrophthalic anhydride is methyl hexahydrophthalic anhydride.

22. A high solids coating composition according to claim 15, wherein up to 50 percent by weight of said dicarboxylic acid anhydride employed in the preparation of said copolymer is selected from the group consisting of hexahydrophthalic anhydride, 2-dodecene-1-ylsuccinic anhydride, tetrahydrophthalic anhydride, methyl tetrahydrophthalic anhydride, camphoric anhydride, and mixtures of the above.

23. A high solids coating composition according to claim 15, wherein said amine-aldehyde crosslinking agent is selected from the group consisting of condensation products of formaldehyde with melamine, substituted melamine, urea, benzoquanamine and substituted benzoguanamine and mixtures of said condensation products and is included in an amount sufficient to provide between about 0.75 and about 2.75 nitrogen crosslinking functional group for each hydroxyl group initially present on said copolymer (A).

* * * * *